(12) United States Patent
Ahn

(10) Patent No.: US 11,565,691 B2
(45) Date of Patent: Jan. 31, 2023

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Seung Jai Ahn, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 150 days.

(21) Appl. No.: 17/103,206

(22) Filed: Nov. 24, 2020

(65) Prior Publication Data

US 2021/0162989 A1    Jun. 3, 2021

(30) Foreign Application Priority Data

Nov. 29, 2019    (KR) .................. 10-2019-0156598

(51) Int. Cl.
*B60W 30/06* (2006.01)
*B60W 50/038* (2012.01)
*G08G 1/16* (2006.01)

(52) U.S. Cl.
CPC .......... *B60W 30/06* (2013.01); *B60W 50/038* (2013.01); *G08G 1/168* (2013.01); *B60W 2540/041* (2020.02); *B60W 2540/30* (2013.01); *G06Q 2240/00* (2013.01)

(58) Field of Classification Search
CPC ............. B60W 30/06; B60W 50/038; B60W 2540/041; B60W 2540/30; G08G 1/168; G06Q 2240/00
See application file for complete search history.

(56) References Cited

U.S. PATENT DOCUMENTS

| | | | |
|---|---|---|---|
| 2016/0189324 A1 | 6/2016 | Eramian et al. | |
| 2017/0313306 A1* | 11/2017 | Nordbruch | ........... G05D 1/0011 |
| 2017/0313307 A1* | 11/2017 | Nordbruch | ............ B60W 30/06 |
| 2017/0323565 A1* | 11/2017 | Nordbruch | ......... G01C 21/3685 |
| 2018/0052460 A1* | 2/2018 | Kurt | ...................... B60W 30/06 |
| 2018/0072345 A1* | 3/2018 | Nicodemus | ........ B62D 15/0285 |
| 2018/0268322 A1* | 9/2018 | Liu | ........................ G08G 1/148 |
| 2018/0341257 A1 | 11/2018 | Nordbruch et al. | |

(Continued)

FOREIGN PATENT DOCUMENTS

| | | |
|---|---|---|
| DE | 102015214005 A1 | 1/2017 |
| DE | 102016206040 A1 | 10/2017 |
| WO | 2019026633 A1 | 2/2019 |

OTHER PUBLICATIONS

European Search Report cited in European application No. 20210149. 9-1009; dated Apr. 13, 2021; 8pp.

*Primary Examiner* — Peter D Nolan
*Assistant Examiner* — Wae L Louie
(74) *Attorney, Agent, or Firm* — Lempia Summerfield Katz LLC

(57) ABSTRACT

An automated valet parking system, an automated valet parking method, an automated valet parking infrastructure, and a vehicle having an automated valet parking feature each enable an unmanned vehicle to autonomously move to and park in a designated parking spot by communicating with the infrastructure. An unmanned vehicle can autonomously move to a pickup area from a parking spot by communicating with the infrastructure.

13 Claims, 10 Drawing Sheets

(56) References Cited

U.S. PATENT DOCUMENTS

| | | | |
|---|---|---|---|
| 2019/0243368 A1 | 8/2019 | Seki | |
| 2019/0276011 A1* | 9/2019 | Eshima | B62D 15/0285 |
| 2019/0283736 A1* | 9/2019 | Watanabe | B60W 30/06 |
| 2020/0031395 A1* | 1/2020 | Matsunaga | B62D 6/001 |
| 2020/0130676 A1* | 4/2020 | Smid | G05D 1/0231 |
| 2020/0148196 A1* | 5/2020 | Lim | G08G 1/0125 |
| 2020/0307648 A1* | 10/2020 | Noguchi | G08G 1/146 |
| 2021/0009111 A1* | 1/2021 | Kang | G05D 1/0022 |
| 2021/0116926 A1* | 4/2021 | Inaba | G07C 5/008 |
| 2021/0122360 A1* | 4/2021 | Okamura | B60W 60/0025 |
| 2021/0139017 A1* | 5/2021 | Sugano | B60W 60/001 |
| 2021/0162989 A1* | 6/2021 | Ahn | B60W 50/038 |

* cited by examiner

| Step | infra | vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user<br>• Transmit automated driving start instruction to vehicle | • Perform engine ON/OFF or power ON/OFF according to the instruction of infra<br>• Lock the vehicle according to the instruction of infra<br>• Determine human or animal inside the vehicle |
| <2> DETERMINATION OF TARGET POSITION AND GUIDE ROUTE | • Determine the target position, guide route, and permissive driving area, and deliver those information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicle and obstacles (TBD), and monitor safety driving and parking operation of each vehicle (supervise) | • Estimate its own position<br>• Inform the infra of its estimated position/with the accuracy and frequency specified below (TOB)<br>• Inform the infra of its own status<br>• Detect the following obstacles (TBD) |
| <5> AUTONOMOUS PARKING | | • Park and Stop the vehicle at the target position designated by infra (equivalent to PAPS parking requirements) |

Fig. 4A

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s² and stop, when the following conditions are met<br>  (1) vehicle received an instruction from infra for E/S<br>  (2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving rom the infra after confirming that there is no obstacle ahead in the path |
| <7> AVPS END | • After the vehicle completes automated driving and parking, the infra transmits Vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g. part failure, human or animal remaining inside the vehicle, etc.)<br>• Perform emergency stop when above fault is detected<br>• After coming to a stop, the vehicle shall remain stopped until it receives an instruction from infra to resume automated driving |

Fig. 4B

| DATA | Contents | Transmit(T)/Receive(R) Infrastructure | Vehicle | Regularly(F)/Event(E) Transmission | Note |
|---|---|---|---|---|---|
| (1) Vehicle qualification information | ID number (VIN) to identify each vehicle | R | T | E When entering the parking | |
| (2) Automated driving preparation instruction | - | T | R | E Right before automated driving start | |
| (3) Vehicle information notification | vehicle state (normal stop/driving/emergency stop, etc.), vehicle position(should) | R | T | F(1Hz) | This is also used for communication fault check by the vehicle |
| (4) Vehicle information response | - | T | R | F(1Hz) | |
| (5) Target position · guide route Delivery | Target position · Passing point location/Permitted time to pass through the point, Maximum speed | T | R | E After automated driving instruction | |
| (6) Driving boundaries delivery | A group of lines to surround the permitted driving area | T | R | E After automated driving preparation instruction | |
| (7) Automated driving start instruction | - | T | R | E After delivery of guide route and driving boundaries, when restarting after emergency stop | |
| (8) Emergency stop instruction | - | T | R | E | |
| (9) Vehicle control release instruction | - | T | R | E | |

Fig. 5

SYSTEM, METHOD, INFRASTRUCTURE, AND VEHICLE FOR AUTOMATED VALET PARKING

CROSS REFERENCE TO RELATED APPLICATION

The present application claims priority to Korean Patent Application No. 10-2019-0156598, filed Nov. 29, 2019, the entire contents of which are incorporated herein for all purposes by this reference.

BACKGROUND

1. Field of the Disclosure

The present disclosure relates to an automated valet parking system, an automated valet parking method, and an automated valet parking infrastructure, and a vehicle having an automated valet parking feature. The present disclosure enables an unmanned vehicle to autonomously move to and park in a designated parking spot by communicating with a parking infrastructure. The present disclosure also enables an unmanned vehicle to autonomously move from a parking spot to a pickup area by communicating with a parking infrastructure.

2. Description of the Related Art

Many modern cities suffer from various problems associated with vehicle parking. For example, there is a risk of a car collision in a parking lot. For parking in crowded places such as a large shopping center, people spend much time entering a parking lot around the destination due to traffic congestion. Furthermore, it also takes time to locate an empty parking spot even after entering the parking lot. In addition, it is inconvenient that a driver has to move to a spot where his or her vehicle is parked at the time of leaving the visited area. It is also inconvenient that a driver often has difficulty in retrieving his or her vehicle due to forgetting the parking spot where his or her vehicle is parked.

SUMMARY

The present disclosure has been made in view of the problems occurring in the related art. An objective of the present disclosure is to enable an automated valet parking service by which a driver can leave his or her vehicle at a predetermined drop-off area and the vehicle without the driver moves to and parks at an empty parking spot within a parking lot.

Another objective of the present disclosure is to enable an automated valet parking service by which a vehicle that is parked autonomously moves from a parking spot to a predetermined pickup area so that the driver can conveniently leave the parking lot.

An automated valet parking method using a parking infrastructure according to one embodiment of the present disclosure is disclosed. The method includes: receiving a parking request for a vehicle; transmitting, to the vehicle, a first guide route indicating a route from a current position of the vehicle to a designated parking spot so that the vehicle can perform autonomous valet parking in the designated parking spot; and controlling the vehicle that is parked in the designated parking spot to move to a different parking spot to change a parking position of the vehicle.

According to one embodiment of the present disclosure, an automated valet parking infrastructure is disclosed that is capable of controlling a vehicle to provide an automated valet parking service to the vehicle. The infrastructure performs the following steps: receiving a parking request for the vehicle; transmitting a first guide route indicating a route from a current position of the vehicle to a designated parking spot; and changing a parking position of the vehicle that is parked in the designated parking spot by controlling the vehicle to move to a different parking spot.

According to one embodiment of the present disclosure, a program including instructions for performing automated valet parking is recorded on a computer-readable recording medium.

BRIEF DESCRIPTION OF THE DRAWINGS

The above and other objectives, features, and other advantages of the present disclosure will be more clearly understood from the following detailed description taken in conjunction with the accompanying drawings, in which:

FIGS. 4A and 4B are diagrams illustrating operations performed by a parking infrastructure and a vehicle for automated valet parking according to one embodiment of the present disclosure;

FIG. 5 is a diagram illustrating a series of communication operations performed by a vehicle and a parking infrastructure for automated valet parking according to one embodiment of the present disclosure;

DETAILED DESCRIPTION OF THE EMBODIMENTS

Figure 1:
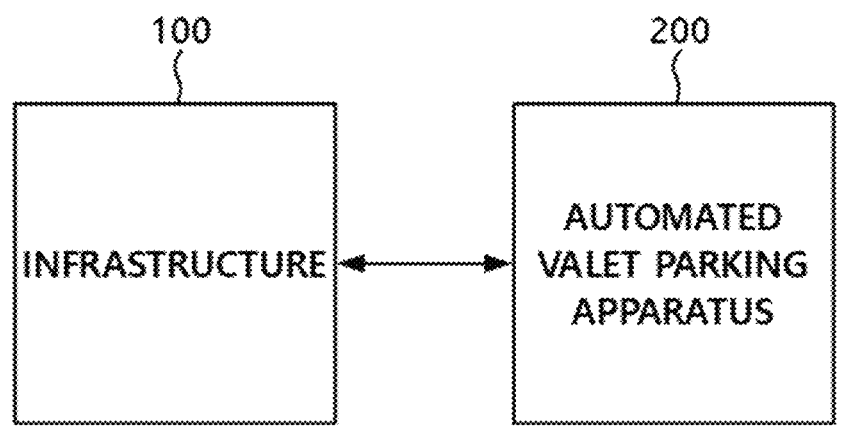
FIG. 1 is a diagram illustrating an automated valet parking system according to one embodiment of the present disclosure.

Herein below, embodiments of the present disclosure are described in detail with reference to the accompanying drawings. The construction and operational effects of the present disclosure should be clearly understood from a detailed description given below. Prior to describing embodiments of the present disclosure in detail, it is noted that throughout the drawings the same components are denoted by the same reference numerals when possible. Also, a detailed description about components and functions that are well known in the art has been omitted where the subject matter of the present disclosure would be obscured by the description.

Terms and words used in the following detailed description of the present disclosure are defined first.

The term "driver" refers to a person who uses an automated valet parking service provided by an automated valet parking system.

The term "driving authority" refers to the authority to control vehicle operations. The term "vehicle operation" refers to an operation such as steering, accelerating, braking, gear shifting, vehicle starting, and vehicle door locking and unlocking.

The term "vehicle" refers to a vehicle having an automated valet parking feature.

The term "control center" refers to a facility that can monitor vehicles parked in a parking lot. The control center determines a target position, a guide route, a permitted driving area, or the like and transmits various instructions including a driving start command and an emergency stop command to a vehicle.

The term "infrastructure" includes a parking facility and sensors installed in the parking facility. Alternatively, in some cases, the term "infrastructure" may refer to a control center that controls gates of a parking lot, vehicles existing within a parking lot, and the like.

The term "target position" refers to one of the parking spots available for parking. Alternatively, the term "target position" refers to a pickup area where a driver takes his or her vehicle to leave the parking lot.

The term "guide route" refers to a route that guides a vehicle as it drives to reach a target position. For example, in a vehicle parking session, the guide route is a route that guides a vehicle from a drop-off area to an empty parking spot. For example, the guide route is provided in the form of instructions. Specifically, it will include instructions such as "move straight 50 m" and "turn left at the next corner".

The term "driving route" refers to a driving path along which a vehicle needs to travel.

The term "permitted driving area" refers to an area where a vehicle can travel within a parking lot. For example, the permitted driving area includes a driving lane. The permitted driving area is defined with barrier walls, parked vehicles, lines, and the like.

FIG. 1 is a diagram illustrating an automated valet parking system according to one embodiment of the present disclosure. Referring to FIG. 1, an automated valet parking system 10 includes a parking infrastructure 100 and an automated valet parking apparatus 200.

The infrastructure 100 refers to an apparatus or system for operating, managing, and controlling constituent elements to be involved in performing automated valet parking. For example, the infrastructure 100 may be a facility in a parking lot. According to embodiments, the infrastructure 100 may include sensors, communication devices, alarm devices, display devices, and a server device that controls those devices. Alternatively, in some cases, the term "infrastructure" may refer to a control center that controls gates of a parking lot, vehicles existing within a parking lot, and the like.

The infrastructure 100 includes a communication circuit for enabling communication with external devices and a processor for performing computation and calculation operations. According to one embodiment, the infrastructure 100 may further include sensors for detecting nearby objects and measuring surrounding parameters. In the present disclosure, determinations and computations performed by the infrastructure 100 are performed by the processor included in the infrastructure 100.

The automated valet parking apparatus 200 refers to a vehicle that can perform automated valet parking. In some embodiments, the automated valet parking apparatus 200 refers to a constituent element or a set of constituent elements of a vehicle, which are required to perform automated valet parking.

Figure 2:
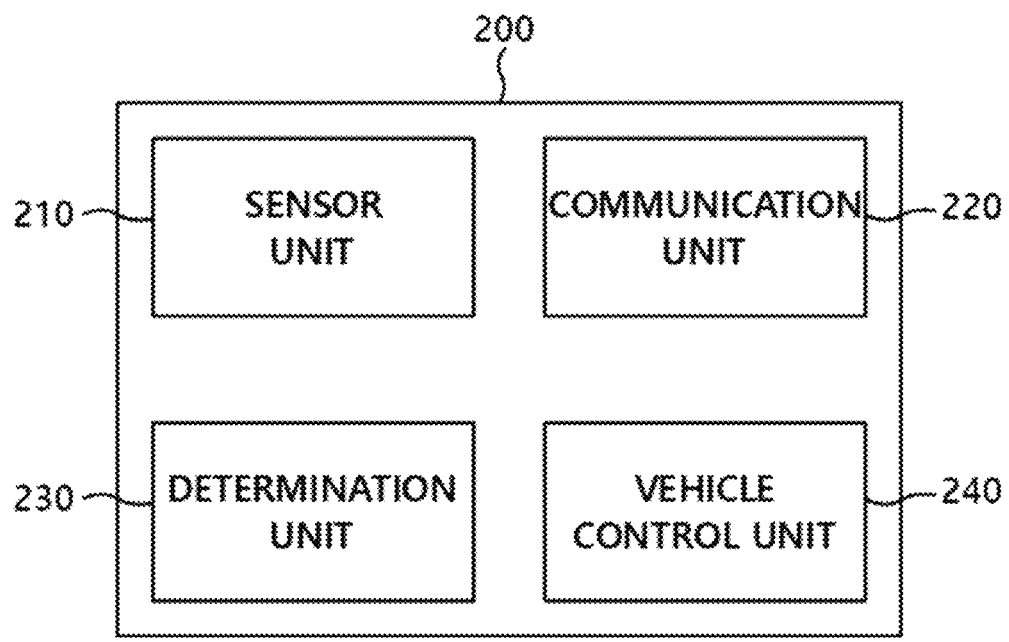
FIG. 2 is a diagram illustrating an automated valet parking apparatus according to one embodiment of the present disclosure.

FIG. 2 is a diagram illustrating an automated valet parking apparatus 200 according to one embodiment of the present disclosure. Referring to FIG. 2, the automated valet parking apparatus (for example, vehicle 200) includes a sensor unit 210, a communication unit (for example, communication circuit) 220, a determination unit (for example, a processor) 230, and a vehicle control unit 240.

The sensor unit 210 monitors an environment around the automated valet parking apparatus 200. In some embodiments, the sensor unit 210 measures the distance between the automated valet parking apparatus 200 and a specific object or detects a nearby object around the automated valet parking apparatus 200. For example, the sensor unit 210 includes at least one of the sensors selected from among an ultrasonic sensor, a RADAR sensor, a LIDAR sensor, a camera, an infrared sensor, a thermal sensor, and a millimeter wave sensor.

The sensor unit 210 is configured to transmit collected data to the communication unit 220 or to the determination unit 230.

The communication unit 220 is configured to communicate data with the infrastructure 100. This communication is called vehicle-to-infra (V2I) communication. The communication unit 220 is also configured to communicate data with other vehicles. This communication is called vehicle-to-vehicle (V2V) communication. The V2I communication and the V2V communication are collectively called vehicle-to-everything (V2X) communication. In some embodiments, the communication unit 220 receives data such as a target position, a guide rote, a driving route, an instruction, or the like from the infrastructure 100, processes the received data, and transmits data generated through the processing to the determination unit 230. The communication unit 220 may transmit data collected and generated by the vehicle 200 to the infrastructure 100. In some embodiments, the communication unit 220 communicates data with a terminal device owned by the driver of the vehicle 200.

The communication unit 220 receives and transmits data by using a wireless communication protocol or a cable communication protocol. Examples of the wireless communication protocol include but are not limited to wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include but are not limited to wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The determination unit 230 controls the overall operation of the vehicle 200. The determination unit 230 controls the vehicle control unit 240 on the basis of the data transmitted from the sensor unit 210 and the communication unit 220. In some embodiments, the determination unit 230 generates a control signal to adaptively control the vehicle control unit 240 according to the data transmitted from the infrastructure 100 and transmits the control signal to the vehicle control unit 240.

In other words, the determination unit 230 refers to a device that performs a series of computations or makes a series of determinations to control the vehicle 200 for the purpose of automated valet parking. For example, the determination unit 230 may be a processor capable of executing a software program including instructions for performing automated valet parking.

Examples of the determination unit 230 include but are not limited to a central processing unit (CPU), a microcontroller unit (MCU), an application specific integrated circuit (ASIC), a field programmable gate array (FPGA), and a graphic processing unit (GPU).

The vehicle control unit 240 controls the vehicle 200 on the basis of the control signal issued by the determination unit 230. In some embodiments, the vehicle control unit 240 controls the vehicle 200 on the basis of the control signal transmitted from the determination unit 230. For example, the vehicle control unit 240 controls various vehicle operations such as driving, stopping, re-driving, steering, accelerating, decelerating, parking, lighting, alarm sounding, and the like.

In other words, it is noted that the vehicle control unit 240 can perform all functions for controlling the operations of the vehicle 200 described herein. For example, the vehicle control unit 240 controls a driving unit, a braking unit, a steering unit, an acceleration unit, an alarm unit, and a flasher.

On the other hand, although not explicitly described herein, it is noted that the operations and/or functions of the vehicle 200 are performed by the conjunction of one or more components selected from among the sensor unit 210, the communication unit 220, the determination unit 230, and the vehicle control unit 240.

Figure 3:
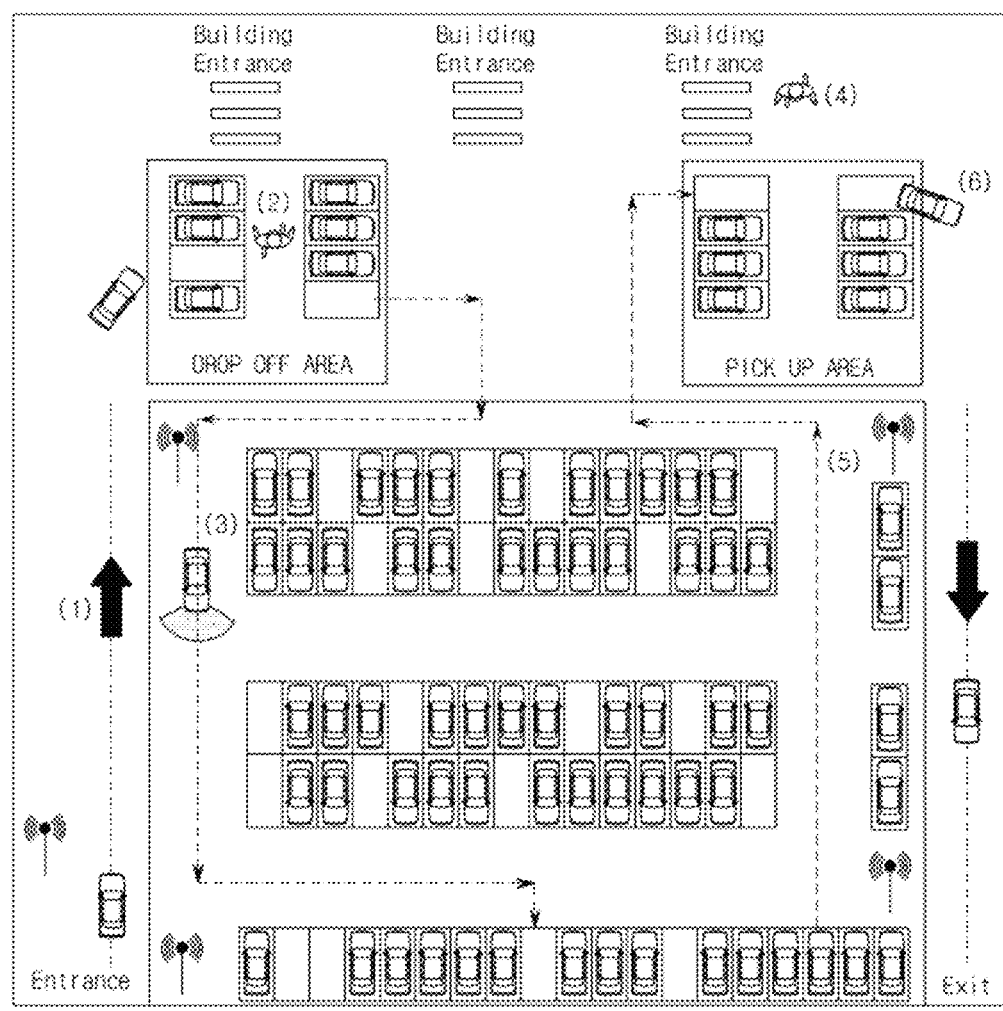
FIG. 3 is a conceptual diagram illustrating an automated valet parking system and an automated valet parking method according to embodiments of the present disclosure.

FIG. 3 is a conceptual diagram illustrating an automated valet parking system and an automated valet parking method according to embodiments of the present disclosure.

Referring to FIG. 3, in step (1), a driver drives a vehicle to a drop-off area in a parking lot.

In step (2), the driver gets out of the vehicle at the drop-off area and a driving authority to control the vehicle is delegated to the infrastructure.

In step (3), the infrastructure searches for available parking spots in the parking lot and designates one of the available parking spots for the vehicle. The infrastructure determines a guide route leading to the designated parking spot. After the parking spot and the guide route are determined, the vehicle autonomously drives in accordance with the guide route until reaching the designated parking spot and performs autonomous parking at the designated parking spot.

In step (4), the driver moves to a pickup area where the vehicle will be returned to the driver to leave the parking lot.

In step (5), the infrastructure determines a suitable target position. For example, the suitable target position may be one of empty parking spots within the pickup area. In addition, the infrastructure determines a guide route which will guide the vehicle to the target position. After the target position and the guide route are determined and transmitted to the vehicle, the vehicle autonomously drives in accordance with the guide route until reaching the target position and performs autonomous parking at the target position.

In step (6), the driver arrives at the pickup area and takes over the driving authority to control the vehicle. The driver drives the vehicle toward the exit of the parking lot.

FIGS. 4A and 4B are diagrams illustrating operations performed by an infrastructure and a vehicle for automated valet parking according to one embodiment of the present disclosure.

Item (1) describes operations of the infrastructure and the vehicle to initiate an automated valet parking procedure. The infrastructure identifies a driver and a vehicle and determines whether the driver and the vehicle are qualified. For example, the infrastructure determines whether the driver is qualified by reading an identification number (ID) or a password that is presented by the driver. The infrastructure determines whether the vehicle is qualified by reading a vehicle identification number, which is a unique number. The vehicle can self-activate or self-deactivate the engine. The vehicle can turn on and off the power supply thereof. A state in which the vehicle engine is deactivated and the power supply is turned on is referred to as an accessary-on (ACC-On) state. The activation/deactivation of the engine and the on/off operation of the power supply may be performed on the basis of instructions received from the infrastructure or may be performed without depending on the instructions received from the infrastructure. The vehicle can lock and unlock the doors. The locking and unlocking of the vehicle doors may be performed on the basis of instructions received from the infrastructure or may be performed without depending on the instructions received from the infrastructure. The vehicle may lock the vehicle doors before entering a parking stage. The driving authority of the vehicle may be delegated to the infrastructure from the vehicle. The driving authority means an authority to control the operations of the vehicle. Examples of the vehicle operation include steering, accelerating, braking, gear shifting, activating/deactivating the engine, and locking/unlocking the vehicle doors. Since the driving authority for the vehicle is delegated to the infrastructure, the infrastructure takes complete control of the vehicle during the automated valet parking process of the vehicle. Accordingly, the vehicle is prevented from performing an unexpected operation, thereby reducing accidents in the parking lot. However, in some cases, the driving authority may be partially delegated to the infrastructure so that the vehicle can still control some of the vehicle operations, or the driving authority may be shared by the vehicle and the infrastructure. For example, a braking operation needs to be performed when an emergency occurs during the automated valet parking procedure. Therefore, when the vehicle detects a danger with the help of an Advanced Driver Assistance Systems (ADAS) sensor, the vehicle applies a brake without intervention of the infrastructure. In addition, the vehicle checks whether a person or animal remains in the vehicle. Since vehicles are usually parked for long hours in a parking lot, if a person or animal is accidentally left in the vehicle during the parking duration, the person or animal would be in danger. Therefore, it is important to ensure that the vehicle is empty before starting an autonomous valet parking operation. The checking for determining whether a person or animal is present in the vehicle is performed with the help of sensors mounted in the vehicle. When the automated valet parking is finished, the driving authority is automatically returned to the driver from the infrastructure.

An existing process is similar to the entering process described above. Specifically, the vehicle receives a vehicle return request. The driver (i.e., owner or user of the vehicle) makes the vehicle return request using a device (for example, smartphone or mobile terminal) that can communicate with the infrastructure. When the driver makes the vehicle return request, the driver transmits vehicle information and driver information to the infrastructure using a terminal. The infrastructure determines whether a target vehicle of the vehicle return request is actually parked in the parking lot on the basis of the received vehicle information and driver information and checks whether the driver is a qualified driver. When the vehicle receives the vehicle return request, the vehicle or the infrastructure checks whether a passenger is present in the vehicle. When it is determined that no passenger is present in the vehicle, the next step is performed. When the driver makes the vehicle return request, the driving authority is delegated from the driver to the vehicle or the infrastructure. In other words, when the driver sends the vehicle return request, the driver loses the authority to control the vehicle. In this case, the vehicle is self-controlled by a built-in controller or controlled by the infrastructure. For example, the vehicle is controlled by the built-in controller or the infrastructure such that the vehicle doors are locked when the vehicle leaves the parking spot and unlocked when the vehicle arrives at the pickup area. When the vehicle arrives at the pickup area, the driving authority is returned to the driver from the vehicle or the infrastructure.

However, as described above, there is a case where the driving authority is partially owned by the vehicle rather than the entire driving authority being delegated to the infrastructure, or there is a case where the driving authority of the vehicle is shared by the vehicle and the infrastructure. After receiving the vehicle return request, the vehicle enters the exiting stage of the automated value parking procedure. In other words, the vehicle departs from the parking spot upon receiving a departure signal. To this end, the infrastructure controls the vehicle to activate the vehicle engine. The infrastructure notifies the driver of its departure from the parking spot by sending a notification message.

In step (2), a target position, a guide route, and a driving route are determined. The determination of the target position, the guide route, and the driving route is performed by the infrastructure. The target position, the guide route, and the driving route determined by the infrastructure are delivered to the vehicle. In other words, the target position, the guide route, and the driving route are delivered to the vehicle both at the entering stage and the exiting stage.

In step (3), the autonomous driving of the vehicle is performed in the parking lot. The autonomous driving of the vehicle includes a driving operation, a stop operation, and a re-driving operation. The autonomous driving of the vehicle is performed in accordance with the instructions of the infrastructure. Alternatively, the autonomous driving of the vehicle may be performed without relying on the instructions of the infrastructure. The vehicle can autonomously drive to the target position along the guide route within a permitted driving area. During the autonomous driving of the vehicle, the vehicle is controlled to drive at or below a limited speed. This speed limit may be a value transmitted from the infrastructure to the vehicle or may be a value stored in the vehicle. In addition, the vehicle is controlled not to deviate from an error margin of the given guide route when driving along the guide route. This preset error margin may be a value transmitted from the infrastructure to the vehicle or may be a value stored in the vehicle. In addition, the vehicle turns with a predetermined minimum turning radius when it is necessary to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement is performed. The target of the position measurement may be a vehicle that is performing the autonomous parking operation, any obstacle existing in the parking lot, or another vehicle that is parked in the parking lot. The infrastructure measures the position of the vehicle or the obstacle and stores the measured position in a database. The infrastructure identifies and detects vehicles or obstacles and monitors each of the vehicles in the parking lot for the safety of the vehicles. Specifically, the infrastructure monitors a vehicle that is in the middle of performing autonomous parking at the target position and issues an appropriate instruction with respect to the vehicle. The vehicle can measure its position by itself. In this case, the vehicle transmits the measured position to the infrastructure. The position of the vehicle needs to be within a predetermined error margin. The predetermined error margin is a value determined by the infrastructure. The vehicle detects obstacles present around the vehicle, measures the positions of the obstacles, and transmits the measured positions of the respective obstacles to the infrastructure. The frequency for communication between the vehicle and the infrastructure may be a predetermined frequency.

In step (5), an autonomous parking operation is performed. The autonomous parking performed in this step refers to an operation in which the vehicle enters an available parking spot after reaching the target position. The vehicle performs autonomous parking by sensing nearby obstacles or other vehicles that are parked therearound, with the help of a distance sensor mounted on the vehicle. Examples of the distance sensor mounted on the vehicle include an ultrasonic sensor, a radar sensor, a lidar sensor, and a camera.

In step (6), an emergency braking operation is performed. The emergency braking of the vehicle is performed according to instructions of the infrastructure or is performed according to its own decision when the vehicle detects an obstacle. The infrastructure instructs the vehicle to apply an emergency brake when it is determined that an area around the vehicle is unsafe. When the infrastructure determines that the surroundings of the vehicle become safe in a case in which the vehicle is in an emergency stop state, the infrastructure instructs the vehicle to resume autonomous driving or autonomous parking. When the vehicle detects an obstacle, the vehicle applies an emergency brake according to its own determination. In this state, the vehicle may notify the infrastructure of the emergency stop event or the type or location of the obstacle which is the cause of the emergency stop. The vehicle reduces its speed according to a predetermined deceleration value that is preset for the emergency braking. This predetermined deceleration value is a value determined by the infrastructure or a value stored in the vehicle. The predetermined deceleration value may vary depending on the type of an obstacle, the position of an obstacle, and the distance between the vehicle and an obstacle. The vehicle resumes autonomous driving or autonomous parking upon receiving a restart instruction from the infrastructure. Alternatively, the vehicle resumes the autonomous driving or autonomous parking when the vehicle self-confirms that the obstacle is removed. The vehicle reports the infrastructure of the restart of the autonomous driving or parking and of the removal of the obstacle.

In step (7), the automated valet parking procedure ends. After the vehicle has completed the autonomous driving and the autonomous parking, the infrastructure issues a control release instruction. The vehicle can activate and deactivate the engine or the power supply according to instructions of the infrastructure or without depending on the instruction of the infrastructure. The vehicle can lock and unlock the vehicle doors according to instructions received from the infrastructure or without depending on the instructions from the infrastructure. The vehicle can apply a parking brake according to instructions received from the infrastructure or without depending on the instructions from the infrastructure.

In step (8), an error control operation is performed. The error control is performed when an error occurs in communication between the vehicle and the infrastructure and/or when a mechanical error of the vehicle occurs. The infrastructure checks communication between the infrastructure and the vehicle for an error. The vehicle detects a communication error by monitoring the communication between the infrastructure and the vehicle. The vehicle detects whether a mechanical error occurs by monitoring operating states of built-in accessories including sensors mounted thereon. The vehicle detects the presence of a person or animal in the vehicle and applies an emergency brake when the presence of a person or animal is detected. The vehicle resumes autonomous parking or driving according to instructions received from the infrastructure when the vehicle is in an emergency stop state. Alternatively, the vehicle may determine, by itself, whether the cause of the emergency braking is removed and resumes autonomous parking or driving when it is confirmed that the cause of the emergency parking is removed.

FIG. 5 is a diagram illustrating a communication process performed by a vehicle and a parking infrastructure for automated valet parking according to one embodiment of the present disclosure.

In step (1), vehicle qualification information is delivered from the vehicle to the infrastructure. The vehicle qualification information includes an identifier that distinguishes each vehicle from the other vehicles. For example, the vehicle qualification information may be a unique number of the vehicle. The vehicle qualification information is transmitted at a stage in which the vehicle enters the parking lot and the autonomous valet parking procedure is started (see (1) of FIG. 4A).

In step (2), an autonomous valet parking preparation instruction is transmitted from the infrastructure to the vehicle. The autonomous valet parking preparation instruction is transmitted before the vehicle starts its autonomous driving.

In step (3), vehicle information is transmitted from the vehicle to the infrastructure. The vehicle information includes state information and position information of the vehicle. The state information includes whether the vehicle is in a driving state, a parking stop state, or an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated on the basis of the communication frequency, the infrastructure determines that an error has occurred in communication between the vehicle and the infrastructure.

In step (4), an acknowledgment of the vehicle information is transmitted from the infrastructure to the vehicle. The acknowledgment of the vehicle information is transmitted at the same frequency as the transmission of the vehicle information that is transmitted in step (3). Therefore, the acknowledgment of the vehicle information is used as a parameter to determine whether an error has occurred in communication between the vehicle and the infrastructure. For example, when the vehicle information does not reach the infrastructure at a specific time that is estimated on the basis of the communication frequency, the infrastructure determines that an error has occurred in communication between the vehicle and the infrastructure.

In step (5), a target position and a guide route are delivered from the infrastructure to the vehicle. The delivery of the target position and the guide route may be performed either before or after an autonomous valet parking start instruction is transmitted from the infrastructure to the vehicle.

In step (6), driving area boundary information is transmitted to the vehicle from the infrastructure. The driving area boundary information includes markings (for examples, lines demarcating parking slots, a central line, and lane boundary lines demarcating a driving lane) that indicate the boundaries of a permitted driving area. The transmission of the driving area boundary information is performed after the autonomous valet parking preparation instruction is delivered. This driving area boundary information is transmitted from the infrastructure to the vehicle in the form of a parking lot map.

In step (7), the autonomous valet parking start instruction is transmitted from the infrastructure to the vehicle. The transmission of the autonomous valet parking start instruction is performed after the guide route and the driving area boundary information are delivered. Alternatively, the autonomous valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The delivery of the vehicle control release instruction is performed after the vehicle is autonomously parked at the designated parking spot.

Figure 6:
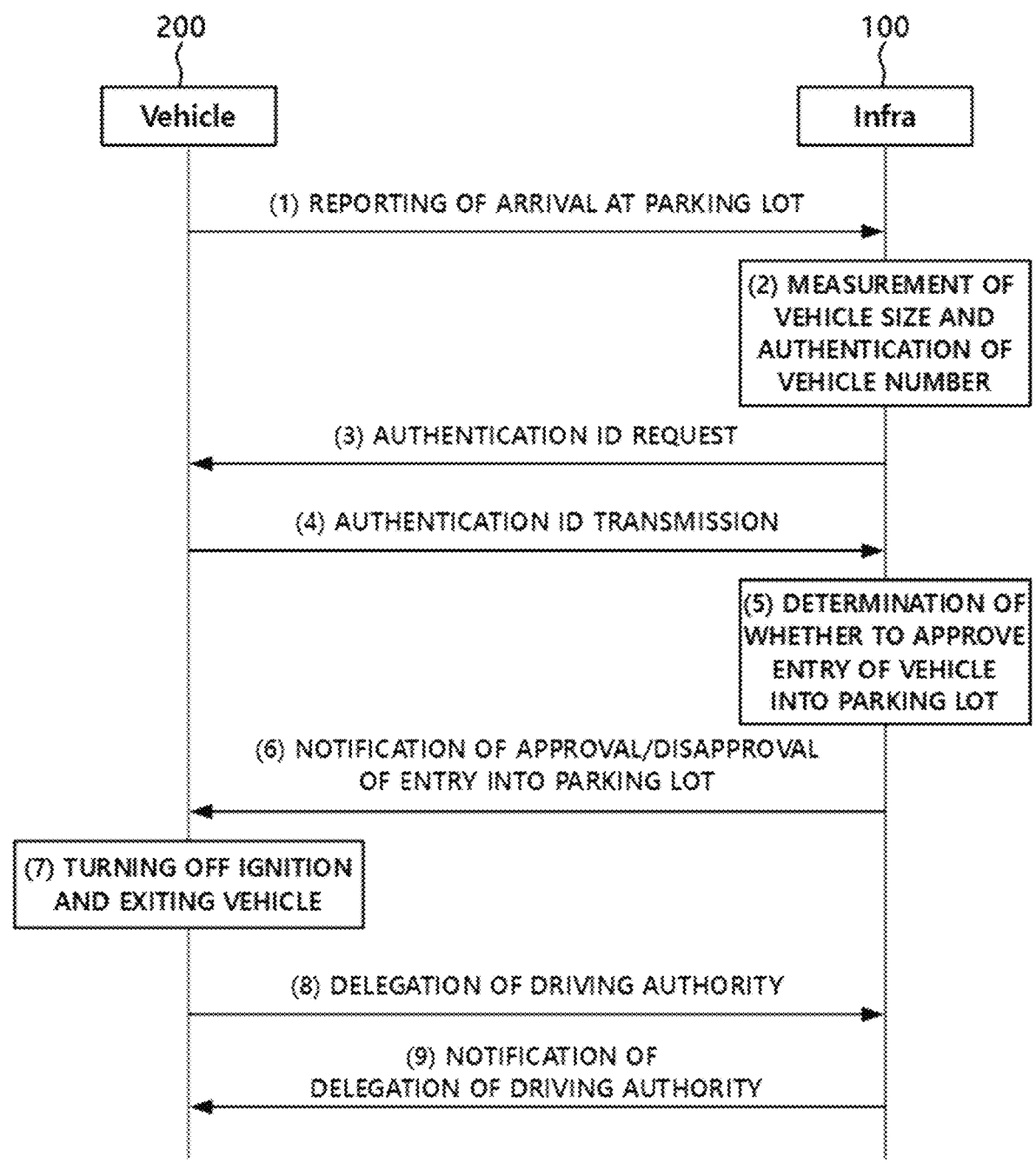
FIG. 6 is a diagram illustrating a series of communication operations performed by a vehicle and a parking infrastructure for automated valet parking according to one embodiment of the present disclosure.

FIG. 6 is a diagram illustrating a communication process performed between a parking infrastructure 100 for automated valet parking and a vehicle 200.

In step (1), the vehicle 200 enters a parking lot and stops at a predetermined stop position. This stop position may be an entrance gate of the parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 notifies the vehicle whether the vehicle 200 is permitted to enter the parking lot on the basis of the authentication results. For example, the infrastructure 100 displays a message indicating approval or disapproval of the entry of the vehicle into the parking lot on a display panel installed around the stop position. The driver drives the vehicle 200 to a drop-off area when the entry of the vehicle into the parking lot is approved. In step (7), the driver turns off (or deactivates) the engine of the vehicle 200, gets out of the vehicle 200, locks the vehicle doors, and leaves the drop-off area. In step (8), a driving authority to control the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification is sent to a driver's smart device through a mobile communication network.

Figure 7:
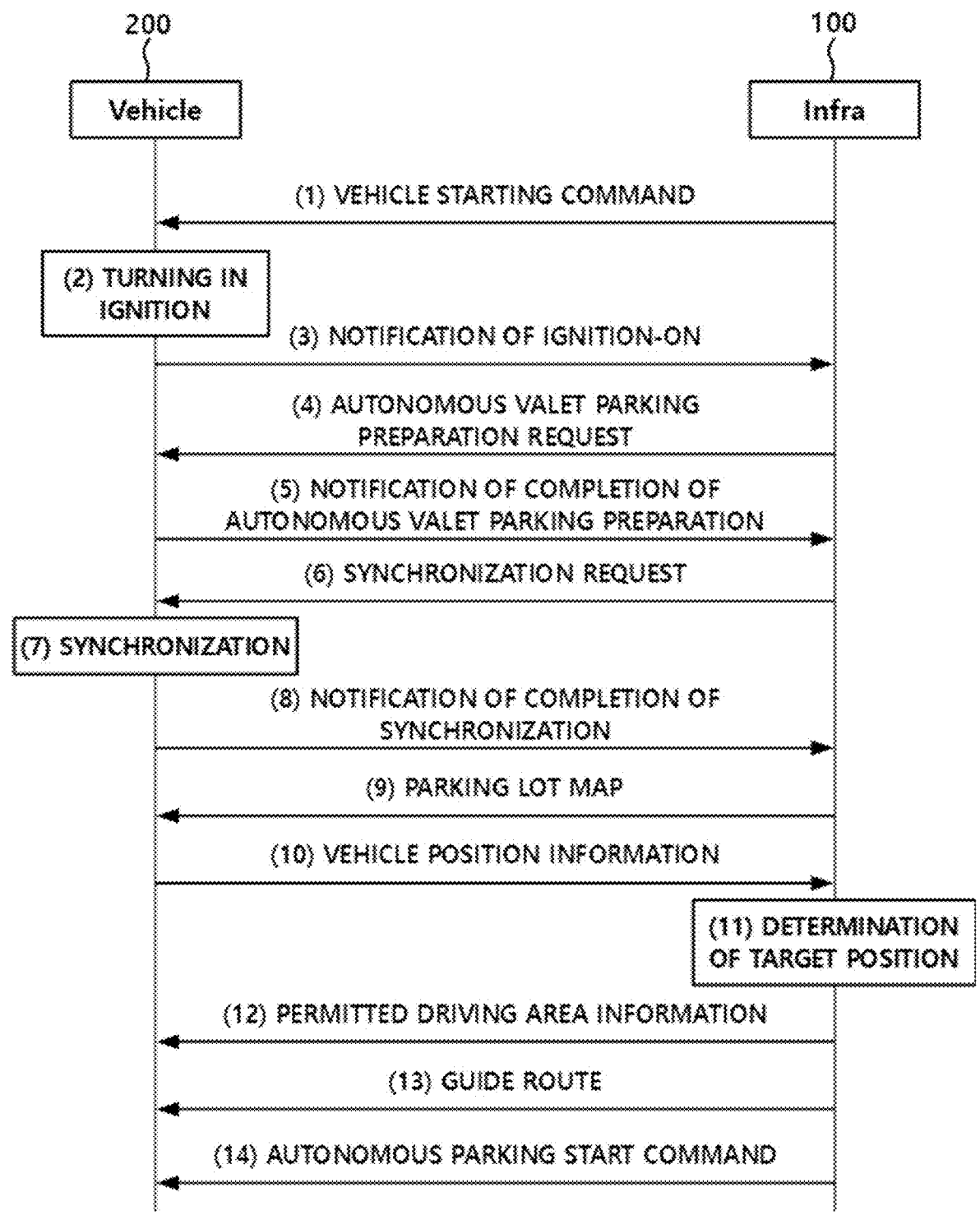
FIG. 7 is a diagram illustrating a series of communication operations performed by a vehicle and a parking infrastructure for automated valet parking according to one embodiment of the present disclosure.

FIG. 7 is a diagram illustrating a communication process performed between a parking infrastructure 100 for automated valet parking and a vehicle 200.

In step (1), the infrastructure 100 transmits an engine activation request (or turn-on request) to the vehicle 200. In step (2), the vehicle 200 activates the engine according to the engine activation request transmitted from the infrastructure 100. In step (3), the vehicle 200 activates the engine and notifies the infrastructure 100 that the vehicle engine is activated. In step (4), the infrastructure 100 transmits an automated valet parking preparation request to the vehicle 200. In step (5), the vehicle 200 transmits a reply to the automated valet parking preparation request to the infrastructure 100. The reply is a message of OK indicating that the preparation for automated valet parking is completed or a message of NG indicating that the preparation for automated valet parking is not completed. In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a reply indicating that the synchronization is completed to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes marking information. In step (10), the vehicle 200 estimates or calculates the position of the vehicle 200 on the basis of the transmitted marking information, and the vehicle 200 transmits the estimated position of the vehicle 200 to the infrastructure 100. In step (11), the infrastructure 100 determines a target position (for example, a parking spot). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
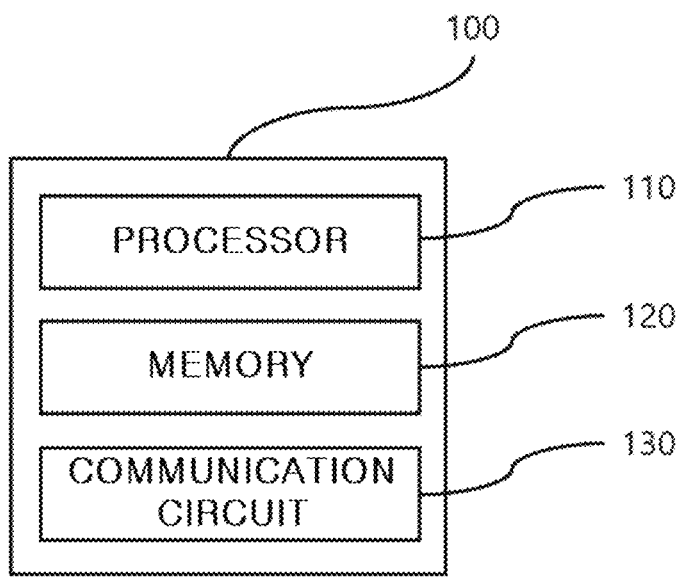
FIG. 8 is a diagram illustrating a parking infrastructure according to one embodiment of the present disclosure.

FIG. 8 is a diagram illustrating a parking infrastructure according to one embodiment of the present disclosure.

Referring to FIGS. 1-8, a parking infrastructure 100 includes a processor 110, a memory 120, and a communication circuit 130.

The processor 110 controls the overall operation of the infrastructure 100. In some embodiments, the processor 110 controls the memory 120 and the communication circuit 130.

The processor 110 receives data, processes the received data, and outputs the processed data. For example, the data may be control instructions for controlling specific operations.

In some embodiments, the processor 110 loads and executes a program (or application) stored in the memory 120 and controls the infrastructure 100 according to the instructions contained in the executed program. In other words, the infrastructure 100 described herein is operated by the processor 110 according to the control program executed by the processor 110. For example, the program executed by the processor 110 adopts a password authentication method according to embodiments of the present disclosure.

The memory 120 saves or retains data necessary for the operation of the infrastructure 100. In some embodiments, the memory 120 saves data, reads stored data, or alters or deletes stored data at the request of the infrastructure 100 (or the processor 110). For example, the memory 120 may include at least one of a nonvolatile memory and a volatile memory.

The communication device 130 exchanges data with the automated valet parking apparatus 200. In some embodiments, the communication circuit 130 receives and transmits data by using a wireless communication protocol or a cable communication protocol. Examples of the wireless communication protocol and the cable communication protocol will not be described redundantly because they are described above.

The communication circuit 130 enables transmission of data to the automated valet parking apparatus 200 from the infrastructure 100 and receives data from the automated valet parking apparatus 200 according to the control of the processor 110. The received data is processed by the processor 110. For example, the communication circuit 130 receives data indicating the status of the automated valet parking apparatus 200 from the automated valet parking apparatus 200.

Figure 9:
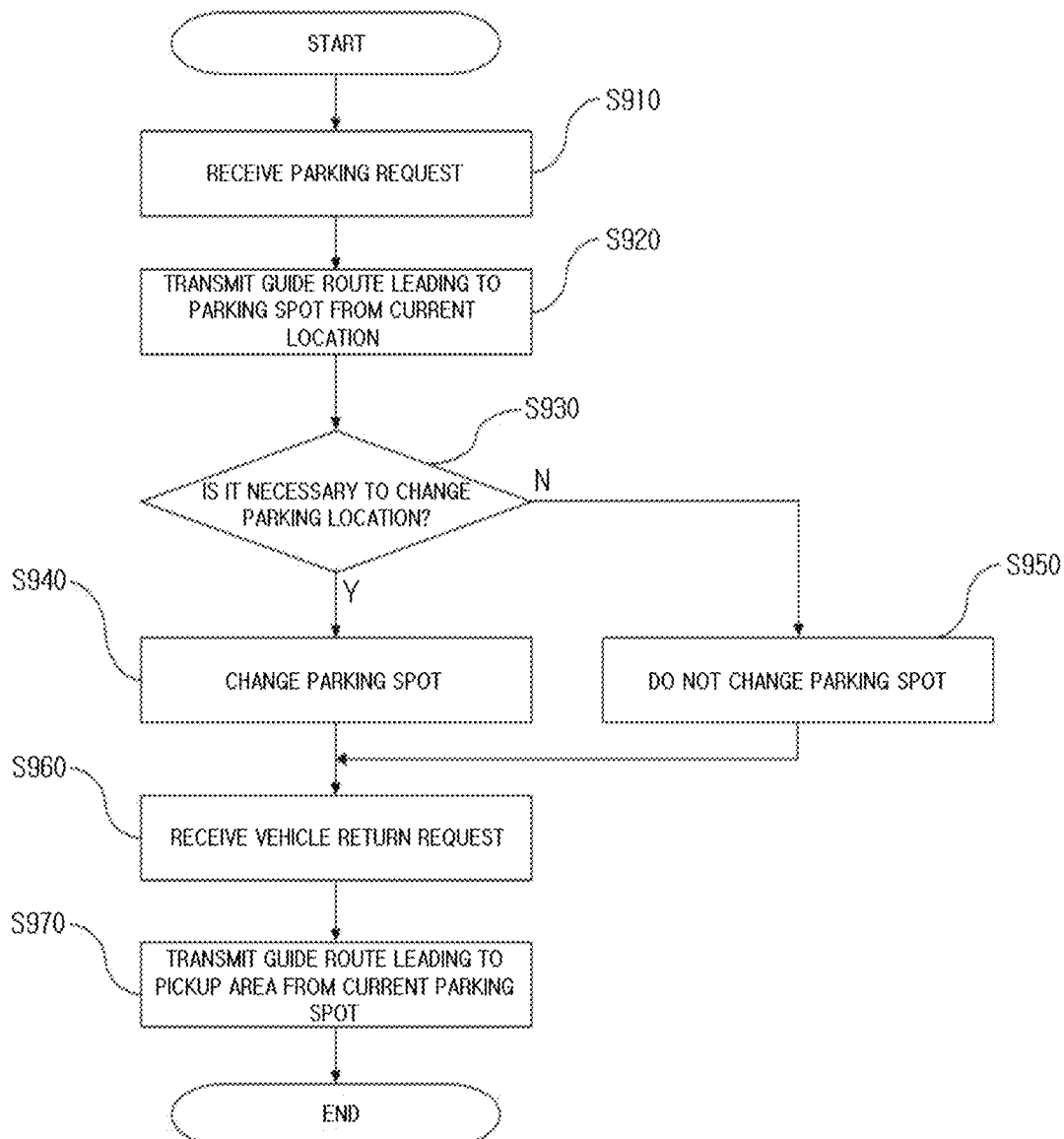
FIG. 9 is a flowchart illustrating an automated valet parking method according to one embodiment of the present disclosure.

FIG. 9 is a flowchart illustrating an automated valet parking method according to one embodiment of the present disclosure. The automated valet parking method described herein with reference to FIG. 9 is performed by the infrastructure 100. Referring to FIGS. 1-9, an infrastructure 100 receives a parking request in step S910. The parking request may be transmitted, not limitedly, from the automated valet parking apparatus 200 or from the driver's terminal of the automated valet parking apparatus 200.

The infrastructure 100 transmits a guide route that guides the apparatus 200 from the current location to a target position for the automated valet parking apparatus 200 in step S920. In some embodiments, the infrastructure 100 selects a parking spot from among many parking spots in the parking lot as the designated parking spot at the target position for the automated valet parking apparatus 200. For example, the designated parking spot may be an empty parking spot. In some embodiments, the infrastructure 100 determines a guide route leading to the target position from the current location of the automated valet parking apparatus 200 and transmits the determined guide route to the automated valet parking apparatus 200. The automated valet parking apparatus 200 performs autonomous valet parking relying on the guide route.

After the parking of the automated valet parking apparatus 200 at the target position in the designated parking spot is completed, the infrastructure 100 determines whether to change the parking position in step S930. The infrastructure 100 may change the parking position in advance of the driver's request for preparation for the vehicle return, thereby reducing the amount of time required to leave the parking lot and increasing the utilization efficiency of the parking spaces in the parking lot.

The infrastructure 100 determines whether to change the parking position of the automated valet parking apparatus 200 on the basis of the payment history of the driver in a facility (for example, department store or shopping mall) associated with the parking lot.

In some embodiments, when the driver performs the payment in the facility associated with the parking lot, the infrastructure 100 receives the payment information of the driver and determines that the parking location will be changed on the basis of the received payment information. For example, when the infrastructure 100 does not receive additional payment information for a predetermined period of time from the last payment, the infrastructure 100 determines whether the parking location will be changed.

The infrastructure 100 adaptively determines whether to change the parking location according to the behavior pattern of the driver in the facility associated with the parking lot.

In some embodiments, the infrastructure 100 monitors the movement of the driver and determines whether to change the parking location according to the monitoring results. For example, the infrastructure 100 determines whether to change the parking location when the driver moves toward the parking lot for a predetermined period of time. Alternatively, the infrastructure 100 determines whether to change the parking location when the driver passes a specific position (for example, a counter). Alternatively, when the distance between the location of the infrastructure 100 and the current location of the driver is less than or equal to a predetermined value, the infrastructure 100 determines whether to change the parking location.

In some embodiments, the infrastructure 100 analyzes the driver's behavior pattern from behavior pattern records collected within the facility associated with the parking lot and determines whether to change the parking location according to the analysis results. For example, the infrastructure 100 analyzes the behavior pattern records and determines whether to change the parking location on the basis of the average time until the driver makes the vehicle return request after the vehicle is parked. The infrastructure 100 has access to the behavior pattern records.

The infrastructure 100 determines to change the parking location according to an external request.

In some embodiments, the infrastructure 100 determines to change the parking location when the driver of the automated valet parking apparatus 200 makes a parking location change request.

In some embodiments, the infrastructure 100 determines to change the parking location when there is a request due to an emergency event.

The infrastructure 100 changes the parking location of the automated valet parking apparatus 200 in step S940 when an affirmative determination (Y in step S930) is made. In some embodiments, the infrastructure 100 designates a new parking spot for the automated valet parking apparatus 200 and transmits a guide route that guides the automated valet parking apparatus 200 from the current, i.e., the designated parking spot to the newly designated parking spot. The automated valet parking apparatus 200 departs from the current parking spot and autonomously moves to and performs parking in the newly designated parking spot.

The infrastructure 100 does not change the parking location of the automated valet parking apparatus 200 in step S950 when a negative determination (N in step S930) is made.

The infrastructure 100 receives a vehicle return request for the automated valet parking apparatus 200 in step S960. In some embodiments, the infrastructure 100 receives a vehicle return request after changing the parking location of the automated valet parking apparatus 200.

The infrastructure 100 transmits a guide route leading to the pickup area from the current parking spot of the automated valet parking apparatus 200 in step S970, to the automated valet parking apparatus 200 upon receiving the vehicle return request. In some embodiments, when the parking spot of the automated valet parking apparatus 200 is changed in step S940, the infrastructure 100 determines a guide route leading to the pickup area from the new parking spot and transmits the guide route to the automated valet parking apparatus 200. The automated valet parking apparatus 200 departs from the parking spot and autonomously drives relying on the guide route so that the automated valet parking apparatus 200 can be returned to the driver.

Figure 10:
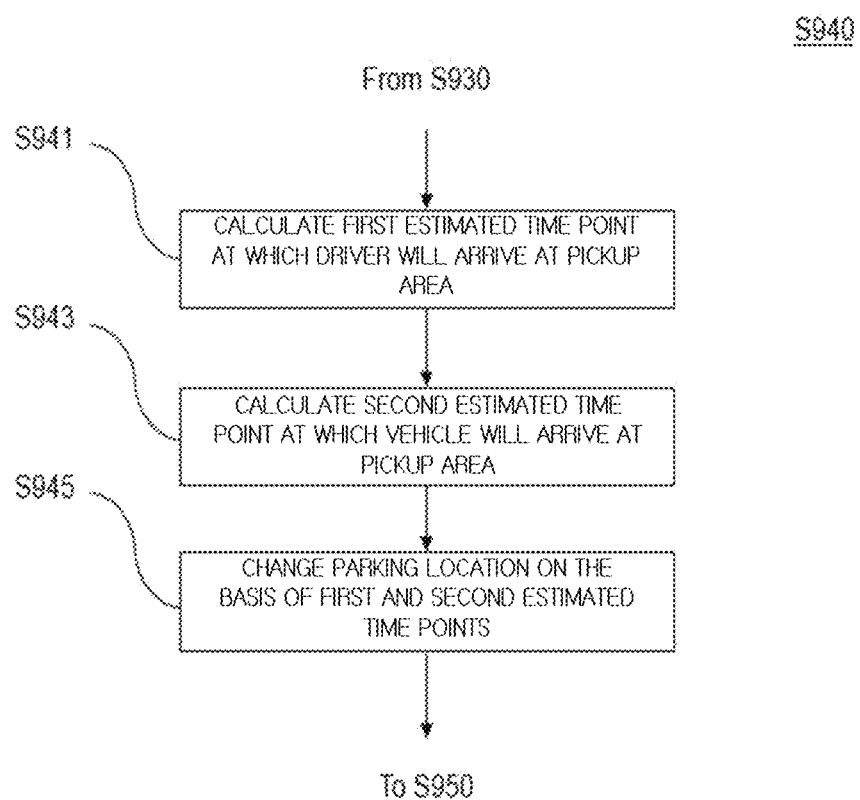
FIG. 10 is a flowchart illustrating a process of changing a parking location of a vehicle according to embodiments of the present disclosure.

FIG. 10 is a flowchart illustrating a process of changing a parking location of a vehicle, according to embodiments of the present disclosure. Referring to FIGS. 1-10, the infrastructure 100 calculates (or estimates) a first estimated time point at which the driver of the automated valet parking apparatus 200 will arrive at the pickup area in step S941. In some embodiments, the infrastructure 100 receives the current location information of the driver and calculates the first estimated time point on the basis of the distance between the current location of the driver and the location of the pickup area. For example, the infrastructure 100 calculates the first estimated time point on the basis of the current location of the driver, the current speed of movement of the driver, and the location of the pickup area.

In some embodiments, the infrastructure 100 may calculate the first estimated time point on the basis of the number (or density) of people moving toward the pickup area in real time.

The infrastructure 100 calculates (or estimates) a second estimated time point at which the automated valet parking apparatus 200 will arrive at the pickup area after departing from the current parking location in step S943. In some embodiments, the infrastructure 100 receives the current location information of the automated valet parking apparatus and calculates the second estimated time point on the basis of the distance between the current location of the automated valet parking apparatus and the location of the pickup area. For example, the infrastructure 100 calculates the second estimated time point on the basis of the current location of the automated valet parking apparatus 200, the current driving speed of the automated valet parking apparatus 200, and the location of the pickup area.

The infrastructure 100 changes the parking location of the automated valet parking apparatus 200 on the basis of the first estimated time point and the second estimated time point in step S945. In some embodiments, the infrastructure 100 changes the parking location of the automated valet parking apparatus 200 when the difference between the first estimated time point and the second estimated time point is greater than or equal to a reference value. In other words, the infrastructure 100 changes the parking location of the automated valet parking apparatus 200 when the first estimated time point is ahead of the second estimated time point.

The infrastructure 100 changes the parking location of the automated valet parking apparatus 200 in such a manner that the difference between the first estimated time point and the second estimated time point is reduced. In other words, the infrastructure 100 changes the parking location of the automated valet parking apparatus 200 such that the first estimated time point and the second estimated time point are matched.

The infrastructure 100 selects a parking spot that reduces the difference between the first estimated time point and the second estimated time point from among many parking spots and transmits a guide route leading to a newly designated parking spot from the existing or current, i.e., designated parking spot. The automated valet parking apparatus 200 departs from the current parking spot and autonomously moves to and performs parking in the newly designated parking spot.

In some embodiments, the infrastructure 100 calculates an estimated time point at which the automated valet parking apparatus 200 will arrive at the pickup area from each of the parking spots within the parking lot and determines a parking spot from which an estimated arrival time with respect to the pickup area is closer to the first estimated time point than the second estimated time point as a new parking spot for the automated valet parking apparatus 200. In other words, the infrastructure 100 determines the parking spot from which an estimated arrival time with respect to the pickup area mostly approximates the first estimated point as a new parking spot.

According to an automated valet parking method according to one embodiment of the present disclosure, the parking position of vehicles parked in advance of the driver's pickup request is reduced. In addition, the efficiency of automated valet parking is increased. In the disclosed embodiments, the changing of the vehicle location from the designated parking spot to a new parking spot prior to the vehicle autonomously driving to and parking in the pick-up area may be optional. Thus, the so-called new parking spot may be a parking spot within the pick-up area, where the driver can regain access and control of the vehicle. Thus, the vehicle may not change location from the designated parking spot prior to driving to the pick-up area and parking in a spot to await the driver.

In one or more embodiments, the described functions may be implemented with hardware, software, firmware, or any combination thereof. When implemented with software, these functions may be stored on or transmitted to a computer-readable medium in the form of one or more instructions or codes. The computer-readable medium refers to any medium that is used to easily transfer a computer program from one computer to another. For example, it may be a communication medium or a computer-readable storage medium. The storage medium may be an arbitrary medium that can be accessed by a computer. The computer-readable media include, but are not limited to, RAMs, ROMs, EEPROMs, optical discs such as CD-ROMs, magnetic disks, and any media that can be accessed by computers and which can be used to transfer a computer program in the form of instructions from one place to another. The computer-readable media are appropriately referred to as media that can be arbitrarily accessed by computers. For example, software can be transferred from websites, servers, or other remote sources through a cable or over a wireless channel. Examples of the cables include coaxial cable, fiber optic cable, twisted pair cable, and digital subscriber line (DSL), and the wireless channel uses infrared frequency waves, radio frequency waves, or ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When embodiments are implemented as program code or code segments, the code segments may be a procedure, function, subprogram, program, routine, subroutine, module, software package, class, instructions, data structures, program command strings, or an arbitrary set of program command strings. One code segment may be connected with another code segment or a hardware circuit by transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more embodiments. Of course, the above-described embodiments do not cover all possible combinations of components and/or methods to implement the present disclosure. Thus, those having ordinary skill in the art should appreciate that many further combinations and substitutions of components and/or methods in various embodiments are possible. Accordingly, the above-described embodiments cover all such alterations, modifications, and variations that fall within the spirit and scope of the appended claims. Moreover, as to the scope of the terms "comprise", "comprising", "comprises", and the like used in the detailed description or the appended claims, it is noted that it is similarly interpreted as "comprising" that is used as a transitional word in the claims.

As used herein, the terms "infer" and "inference" generally refer to a process of determining or inferring a state of a system, environment, and/or user from a set of observations of events and/or data. Inferring can be used to identify a specific situation or action, or can generate a probability distribution of certain states, for example. Inferring is probabilistic. In other words, inferring may mean a calculation of a probability distribution of those states, based on study on data and events. Inferring may involve techniques used to construct a higher level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, though not necessarily, computer entities such as hardware, firmware, any combination of hardware and software, software, and a software program being executed. For example, the term "component" may refer to, not necessarily, a process running on a processor, a processor, an object, an executable execution thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

What is claimed is:

1. An automated valet parking method, the method comprising:
    receiving a parking request for a vehicle;
    transmitting, to the vehicle, a first guide route that guides the vehicle to a designated parking spot from a current location of the vehicle so that the vehicle is able to perform automated valet parking in the designated parking spot;
    determining whether re-parking of the vehicle is required without a user request while the vehicle is parked at the designated parking spot; and
    when it is determined that re-parking of the vehicle is required, instructing re-parking of the vehicle by transmitting a second guide route that guides the vehicle from the designated parking spot to a new designated parking spot,
    wherein the new designated parking spot is determined as another parking spot closer to a pickup area than the designated parking spot where the vehicle is parked, based on an expected arrival time of the user to the pickup area.

2. The method according to claim 1, wherein the transmitting of the first guide route comprises:
    selecting any one of parking spots in a parking lot as the designated parking spot;
    determining the first guide route that guides the vehicle from the current location to the designated parking spot; and
    transmitting the determined first guide route.

3. The method according to claim 1, wherein the instructing of re-parking of the vehicle comprises:
    calculating a first estimated time point at which a driver of the vehicle will arrive at a pickup area after departing from a current location of the driver;
    calculating a second estimated time point at which the vehicle will arrive at the pickup area after departing from the designated parking spot; and
    determining the new designated parking spot of the vehicle on the basis of a difference between the first estimated time point and the second estimated time point.

4. The method according to claim 3, wherein the instructing of re-parking of the vehicle further comprises:
    determining the new designated parking spot of the vehicle such that the difference between the first estimated time point and the second estimated time point is reduced.

5. The method according to claim 1, wherein the determination of the new designated parking spot is made on the basis of at least one of a payment history of a driver within a facility associated with a parking lot in which the vehicle is parked, a behavior pattern of the driver within the facility associated with the parking lot, or any combination thereof.

6. The method according to claim 1, further comprising: returning a driving authority for the vehicle when the automated valet parking is completed.

7. The method according to claim 1, further comprising: transmitting an emergency stop instruction to the vehicle when an error is detected inside or outside the vehicle.

8. The method according to claim 1, further comprising:
    receiving a vehicle return request for the vehicle; and
    transmitting a third guide route that guides the vehicle from the new designated parking spot to the pickup area.

9. A non-transitory computer-readable recording medium storing a program including instructions for performing the automated valet parking method according to claim 1.

10. An infrastructure for controlling a vehicle to perform automated valet parking, the infrastructure performing the steps of:
    receiving an authority for a vehicle;
    transmitting, to the vehicle, a first guide route that guides the vehicle to a designated parking spot from a current location of the vehicle so that the vehicle is able to perform automated valet parking in the designated parking spot;
    determining whether re-parking of the vehicle is required without a user request while the vehicle is parked at the designated parking spot; and
    when it is determined that re-parking of the vehicle is required, instructing re-parking of the vehicle by transmitting a second guide route that guides the vehicle from the designated parking spot to a new designated parking spot,
    wherein the new designated parking spot is determined as another parking spot closer to a pickup area than the designated parking spot where the vehicle is parked, based on an expected arrival time of the user to the pickup area.

11. The infrastructure according to claim 10, wherein the infrastructure further performs the steps:
    calculating a first estimated time point at which a driver of the vehicle will arrive at the pickup area after departing from a current location of the driver, calculating a second estimated time point at which the vehicle will arrive at the pickup area after departing from the designated parking spot, and
    determining the new designated parking spot of the vehicle such that a difference between the first estimated time point and the second estimated time point is reduced.

12. The infrastructure according to claim 10, wherein the infrastructure returns a driving authority for the vehicle when the automated valet parking is completed.

13. The infrastructure according to claim 10, wherein the infrastructure transmits an emergency brake instruction to the vehicle when an error is detected inside or outside the vehicle.

\* \* \* \* \*